(12) United States Patent
Pecen et al.

(10) Patent No.: US 8,179,855 B2
(45) Date of Patent: May 15, 2012

(54) METHOD, AND ASSOCIATED APPARATUS, FOR COMMUNICATING DATA AT REDUCED TRANSMISSION LATENCY IN RADIO COMMUNICATION SYSTEM HAVING SLOTTED INTERFACE

(75) Inventors: Mark Pecen, Waterloo (CA); Mihal Lazaridis, Waterloo (CA); Sean Simmons, Waterloo (CA); Johanna Dwyer, Waterloo (CA)

(73) Assignee: Research In Motion Limited, Waterloo (CA)

(*) Notice: Subject to any disclaimer, the term of this patent is extended or adjusted under 35 U.S.C. 154(b) by 752 days.

(21) Appl. No.: 11/348,618

(22) Filed: Feb. 7, 2006

(65) Prior Publication Data

US 2007/0183387 A1    Aug. 9, 2007

(51) Int. Cl.
*H04W 4/00* (2009.01)
(52) U.S. Cl. .......................... 370/330; 370/436
(58) Field of Classification Search ............. 370/345
See application file for complete search history.

(56) References Cited

U.S. PATENT DOCUMENTS

| | | | | |
|---|---|---|---|---|
| 6,094,575 A | * | 7/2000 | Anderson et al. | 455/422.1 |
| 6,920,128 B1 | * | 7/2005 | Haugli et al. | 370/348 |
| 7,154,875 B2 | * | 12/2006 | Masui et al. | 370/342 |
| 7,194,017 B2 | * | 3/2007 | Hervey et al. | 375/132 |
| 2002/0018458 A1 | * | 2/2002 | Aiello et al. | 370/348 |
| 2002/0044527 A1 | | 4/2002 | Jiang et al. | |
| 2002/0136169 A1 | * | 9/2002 | Struhsaker et al. | 370/280 |
| 2004/0032853 A1 | * | 2/2004 | D'Amico et al. | 370/349 |
| 2004/0151143 A1 | * | 8/2004 | Abdesselem et al. | 370/336 |
| 2004/0151156 A1 | * | 8/2004 | Noel et al. | 370/349 |
| 2004/0213170 A1 | * | 10/2004 | Bremer | 370/282 |
| 2005/0078637 A1 | * | 4/2005 | Rajkotia | 370/335 |
| 2005/0232219 A1 | * | 10/2005 | Aiello et al. | 370/348 |
| 2005/0271028 A1 | * | 12/2005 | Proctor, Jr. | 370/345 |
| 2006/0018279 A1 | * | 1/2006 | Agrawal et al. | 370/330 |
| 2006/0203924 A1 | * | 9/2006 | Casaccia et al. | 375/260 |
| 2007/0058595 A1 | * | 3/2007 | Classon et al. | 370/337 |
| 2007/0116024 A1 | * | 5/2007 | Zhang et al. | 370/412 |
| 2007/0133475 A1 | * | 6/2007 | Peisa et al. | 370/335 |
| 2007/0150788 A1 | * | 6/2007 | Zhuyan | 714/749 |
| 2007/0165709 A1 | * | 7/2007 | Walker et al. | 375/219 |
| 2010/0054308 A1 | * | 3/2010 | Brisebois et al. | 375/133 |

FOREIGN PATENT DOCUMENTS

| | | |
|---|---|---|
| EP | 1107637 A1 | 6/2001 |
| EP | 1471660 A2 | 4/2004 |
| WO | 0176096 A1 | 10/2001 |

* cited by examiner

*Primary Examiner* — Nittaya Juntima
*Assistant Examiner* — Tito Pham

(57) ABSTRACT

A method, and associated apparatus, facilitates the communication of data of a radio block by a sending station to a receiving station, within a single time frame. Communication resources are allocated within a single time frame across a plurality of radio carriers. And, the data corresponding to a radio block is scheduled for communication, and is communicated, within the single time frame. Reduced levels of latency relative to conventional operations is provided.

16 Claims, 5 Drawing Sheets

METHOD, AND ASSOCIATED APPARATUS, FOR COMMUNICATING DATA AT REDUCED TRANSMISSION LATENCY IN RADIO COMMUNICATION SYSTEM HAVING SLOTTED INTERFACE

The present invention relates generally to the communication of data pursuant to a high-speed data radio communication service, such as an Enhanced Data for GSM Evolution (EDGE) communication service. More particularly, the present invention relates to a method, and an associated apparatus, by which to allocate and to provide for communication of the data at reduced levels of latency. Communication resources are allocated to provide for communication of data of a radio block over multiple carriers and within a reduced time period, e.g., within a single time frame.

BACKGROUND OF THE INVENTION

Data communication systems are used by which to communicate data and their use is pervasive in modern society. The capability of a data communication system is sometimes defined in terms of its throughput capability due to the significance of the throughput rate at which data is communicated to the performance of a data communication service. High-speed data communication services have historically been performed by way of wireline communication systems. However, the evolution of communication technologies increasingly permits high-speed data communication services to be carried out by way of radio, i.e., wireless, communication systems. Increasingly, data services that necessitate the communication of large amounts of data in short periods of time are able to be performed by way of a radio communication system that provides for the communication of the data at high data throughput rates. With increasingly data intensive communication services, there is a continuing need to provide for radio communication systems that provide for yet higher data throughput rates.

A cellular communication system is exemplary of a radio communication system that increasingly is used by which to communicate data at high data throughput rates. A GSM (Global System for Mobile communications) cellular communication system, for instance, has been developed and widely deployed that provides for the performance of data communication services. Many GSM systems provide for GPRS (General Packet Radio Service), a high-speed data communication service. An extension to GPRS, referred to as EDGE (Enhanced Data for GSM Evolution), is presently undergoing deployment. EDGE communications, in general, adds 8-PSK modulation, incremental redundancy, and adaptive modulation and coding to GPRS communications. And, through these additions, an EDGE-capable communication system provides for communication of data at data throughput rates that are significantly higher than those achievable in GSM/GPRS only communication systems. In spite of improved communication capabilities of an EDGE-capable system, there are ongoing efforts yet further to improve the communication capabilities of communications in such a system.

In the existing EDGE communication scheme, a relatively high transmission latency limits communication capabilities. The transmission latency results as, in the existing scheme, data of a radio block is transmitted over multiple TDMA (Time Division Multiple Access) frames of a slotted interface defined in the communication scheme. More particularly, the data of a radio block is transmitted in four bursts occurring over four TDMA frames. And, as a result, to communicate the data of the radio block requires the time period for responding to the four frames in which to communicate the data of the radio block. When the data is communicated pursuant to an acknowledgment scheme, additional time is required in which to acknowledge the reception of the communicated data.

If a manner could be provided by which to reduce the transmission latency of the existing communication scheme, improved effective data throughput rates and improved communication performance would result.

It is in light of this background information related to communication of data in a slotted-interface radio communication system that the significant improvements of the present invention have evolved.

DETAILED DESCRIPTION

Figure 1:
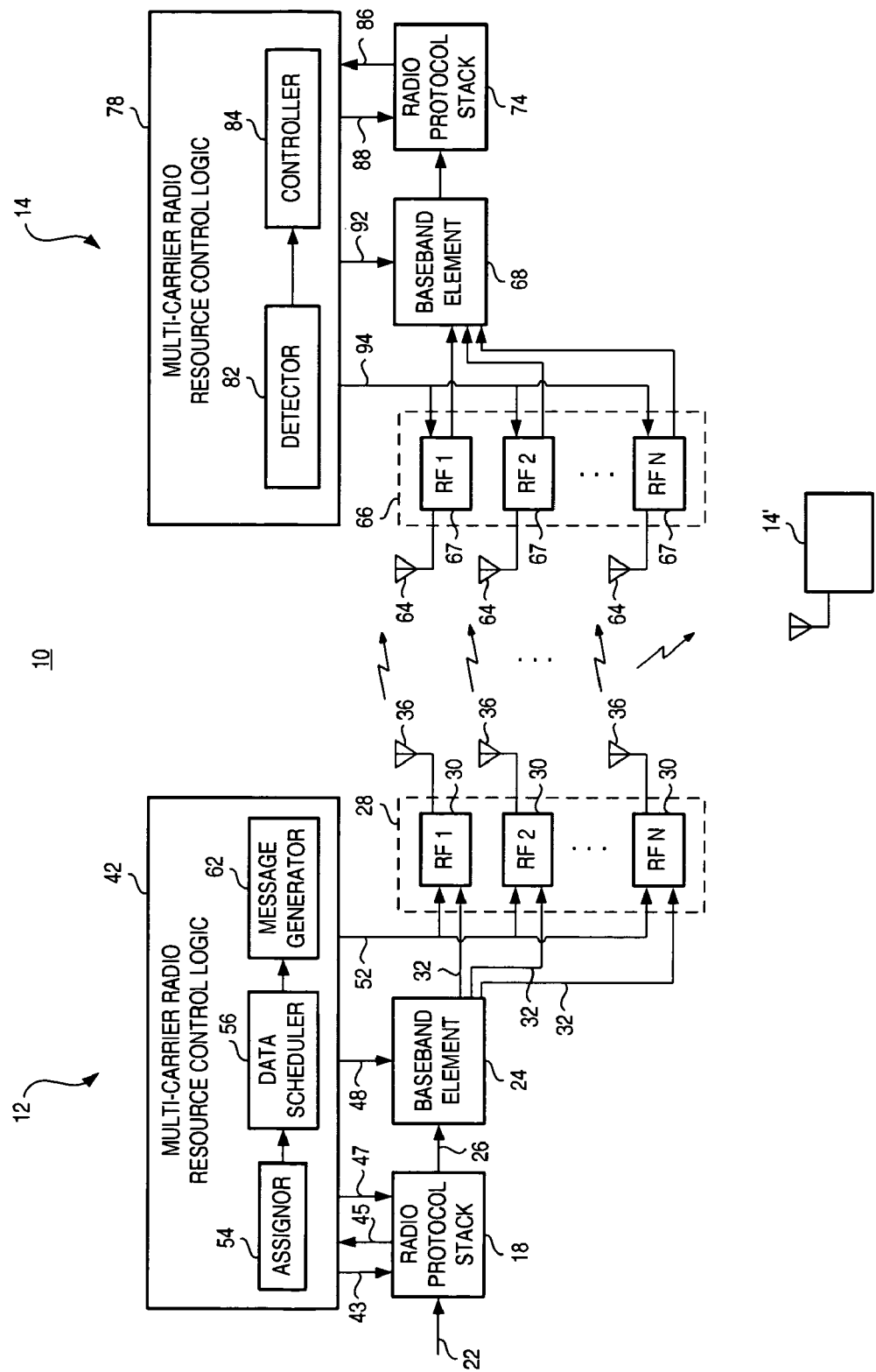
FIG. 1 illustrates a functional block diagram of an exemplary communication system that includes an embodiment of the present invention as a portion thereof.

The present invention, accordingly, advantageously provides a method, and an associated apparatus, for use in the communication of high-speed data to perform a high-speed data radio communication service, such as in the communication of EDGE (Enhanced Data for GSM Evolution) data communicated during operation of an EDGE-capable communication system.

Through operation of an embodiment of the present invention, communication resource allocations are made to provide for the communication of data at reduced levels of latency. Communication resources are allocated to provide for communication of data of a radio block over multiple carriers within a reduced time period, e.g., a single time frame.

By reducing the latency of the communication of the data, improved effective data throughput rates are achievable. Improved communication performance is provided as the reduced latency permits data needed to effectuate a communication service to be communicated within a smaller time period.

Communication resources are allocated to communicate the data of a radio block. While, conventionally, communication resources are allocated upon a single carrier over a time period of four time frames, the communication resources allocated pursuant to operation of an embodiment of the present invention are allocated within a single time frame, across a plurality of radio carriers. Thereby, the data of an entire radio block is communicated within a single time frame, rather than the four time frames over which the resources are conventionally allocated and during which the data of the radio block is conventionally communicated.

In one aspect of the present invention, a determination is made of how many, and which, radio carriers are available upon which to allocate communication resources. The determination is made, for instance, making use of knowledge of the communication capabilities of the communication stations that are to be parties to a communication session. The knowledge of the communication capability of a remote station, e.g., a mobile station, is provided by a message sent by the mobile station to the network infrastructure to inform the network infrastructure of the communication capability of the mobile station. And, responsive to receipt of the message, allocations are available upon, or limited to, the radio carriers across which the mobile station is capable of receiving, or transmitting, data.

In another aspect of the present invention, communication resources are allocated both for downlink and uplink communications. Communication resource allocations made at the network infrastructure for uplink communications are communicated to the mobile station for subsequent use by the mobile station for the uplink communications. And, communication resource allocations made for the downlink communications are also communicated to the mobile station to alert the mobile station of the allocations to permit its operation best to detect and operate upon the data, when communicated.

In another aspect of the present invention, communication resources are assigned and data communications are scheduled at a radio resource control logic layer of the communication system. The communication resource assignments are made responsive to the communication capabilities of the communication stations that are to be involved in the communication of the data and other criteria, such as the availability of communication resources on the radio carriers otherwise available for communications by the communication stations. And, when the resource allocations are assigned, the data scheduler schedules the communication of the data to effectuate its communication to effectuate the communication service. When the communication stations are formed of a plurality of RF transceiver front ends, each operable over a selected radio carrier, control signals are generated at the radio resource control logic layer and provided to the transceiver front ends to cause their operation in conformity with the assigned resources. And, when a communication station is formed of a wideband RF transceiver front end, control signals generated at the radio resource control layer control its operation.

Communication resource allocations are made subject to various constraints, including, e.g., time slots that are allocable, the available RF carriers, time requirements required of the communication stations to tune to different carriers, as well as other criteria.

In general, an embodiment of the present invention is implementable in any of various radio communication systems that provide for multiple radio frequency channels using a time slotted protocol for data interchange. A remote communication station operates to receive and decode information communicated thereto on two or more radio frequencies simultaneously. The transmission of the data is controlled through the assignment of communication resources and scheduling of data communications in conformity with the resource assignments.

Data conventionally is communicated over a number of frames that constitute a radio block. This amount of data, through operation of an embodiment of the present invention, is instead communicated within a selected number of time slots of a single time frame. The selected number of time slots corresponds to the number of frames that constitutes a conventionally-defined radio block.

In a further aspect of the present invention, a communication station that receives data communicated thereto upon the time slots allocated within a single time frame acknowledges receipt pursuant to an acknowledgment scheme, either a positive acknowledgment or a negative acknowledgment communication scheme. In a positive acknowledgment scheme, the acknowledgments are communicated back to a sending communication station within the same time frame as the time frame in which the data is communicated to the receiving station.

In these and other aspects, therefore, a method, and an associated apparatus, is provided for facilitating communication of data by a first communication station. The first communication station is operable pursuant to a communication scheme that provides for mobile allocation index offset. The data is of an amount corresponding to data communicable during a selected number of time slots of a radio block formed across a plurality of time frames. An assignor is adapted to receive an indication of the amount of data to be communicated by the first communication station. The assignor is configured to assign communication resources defined in terms of mobile allocation index offsets across a plurality of radio carriers. A data scheduler is adapted to receive an indication of the communication resources assigned by the assignor. The data scheduler is configured to schedule communication of the data in conformity with the assignations made by the assignor. The schedule of the communication of the data is made by the scheduler providing for completion of the communication of the data within a single time frame of the plurality of time frames.

With these and other aspects in mind, reference is first made to FIG. 1. FIG. 1 illustrates a communication system, shown generally at 10, in which an embodiment of the present invention is operable. In the exemplary implementation, the communication system 10 forms a data radio communication system that operates in general conformity with the operating protocols of a GSM/GPRS/EDGE (Global System for Mobile communications/General Packet Radio Service/Enhanced Data for GSM Evolution) communication scheme. The communication system, however, is analogously also representative of other slotted-interface communication systems. While the following description shall describe the communication system in terms of its exemplary implementation, the teachings of the present invention are analogously applicable for implementation in other types of communication systems, operable pursuant to other operating protocols.

The communication system 10 includes communication stations 12 and 14. The communication station 12 is representative of a network station. The network station is formed of elements of a network part of the communication system, and the communication station shall, at times, be referred to herein as a network station. The communication station 14 is representative of a mobile station, and the communication station 14 shall, at times, be referred to herein as a mobile station 14.

A communication station 14' is also shown in FIG. 1. The communication station 14' represents another mobile station that is capable of communicating with the network station 12. Separate point-to-point communication sessions, as well as multicast communications, are possible between the network station 12 and the communication stations 14 and 14'. And, the communication system defines a multiple access communication system.

Any of the communication stations 12 and 14 are capable of generating and communicating EDGE data pursuant to performance of an EDGE data service. Exemplary operation of the communication system shall be described with respect to downlink communication of data, i.e., data originated at the network station and communicated to the mobile station. Operation of the communication system in an uplink direction, i.e., from the mobile station to the network station is analogous.

The EDGE/GPRS/GSM operating protocols include definitions of an EDGE channel structure. The EDGE channel structure defines a slotted interface pursuant to a TDMA (Time Division Multiple Access) scheme in which groups of eight time slots forms a frame. And, a radio block is defined as a group of four frames. Each frame is of a 4.615 ms time length, and each time slot of the frame is one-eighth of such length or 577 ms. As a radio block is formed of four time frames, the time length of a radio block is 4 times 4.615 ms or 18.46 ms. When communication resources are allocated for the communication of data of a radio block, conventionally, at least 18.46 ms are required to communicate the data. This defines the transmission latency of EDGE communications. Further latency exists if the receiving station transmits an acknowledgment, such as pursuant to an uplink state flag (USF) mechanism also set forth in the aforementioned protocols. The acknowledgment is returned in the next TDMA frame following the reception of the full radio block. When an acknowledgment is utilized, five TDMA frames, or 20.824 ms time lengths corresponding to five TDMA frames of 4.615 ms time lengths need to be completed. An entire cycle requires nine, four plus four plus one, time frames, or 41.535 ms time length extending between the beginning of the reception of a block of data to the end of transmission of a radio block to the end of transmission of an acknowledgment block. As the transmission latency is relatively lengthy, the latency forms a constraint on the communication performance of a conventional EDGE-capable communication system.

The communication stations 12 and 14 are functionally represented in FIG. 1. The communication stations are formed of functional elements that are implementable in any desired manner. Also, the functions performed by the various functional elements are not necessarily positioned together at a single physical entity, but, instead, can be distributed across two or more physical entities. For example, the elements shown to form portions of the network station 12 need not be positioned at a single network entity, but rather can be distributed across more than one entity, such as, for instance, across a base station controller and a base transceiver station of the network.

The transmit chain portion of the network station 12 is shown in FIG. 1. The network station includes a radio protocol stack 18 to which user application data is applied by way of the line 22. The application data is for communication to one or more mobile stations 14 pursuant to one or more EDGE communication sessions. The radio protocol stack includes various logical layers including a radio resource management (RRM) layer. Data is provided by the radio protocol stack to a baseband element 24 by way of the lines 26. The baseband element performs various baseband operations including baseband processing, modulation, and channel coding.

The network station also includes a radio element 28 formed of a plurality of radio frequency transceiver front ends (RF 1-RF N) 30 to which the data, once operated upon by the baseband element, is provided by way of the lines 32. The network station includes N RF transceiver front ends 28. Each of the transceiver front ends is coupled to an antenna transducer 36 that operates to transduce data into electromagnetic form for communication by way of the slotted radio air interface to the one or more mobile stations 14. That is to say, the network station is capable of communicating on N carriers, such as pursuant to a mobile allocation index offset (MAIO) scheme. The mobile station 14, e.g., is similarly configured and operable.

The network station 12 also includes a multi-carrier radio resource control logic element 42 of an embodiment of the present invention. The logic element 42 is functionally coupled to the radio protocol stack 18, here by way of the lines 43, 45, and 47, to the baseband element 24 by way of the lines 48, and to the transceiver front ends 28 of the radio element by way of the lines 52. The logic element performs various functions and, in the exemplary implementation, is embodied at the radio resource management logical layer.

The logic element 42 includes an assignor 54, a data scheduler 56, and a message generator 62. The functions performed by the parts of the logic element 42 are carried out in any desired manner, such as, for example, by algorithms executable by processing circuitry.

The assignor receives indications of the data that is to be communicated pursuant to performance of a communication service during a communication session, e.g., here, downlink data to be communicated by the network station to one or more mobile stations. The indication of the characteristic includes, for instance, the amount of data that is to be communicated or other indication that facilitates assignment by the assignor of the channel resource allocations or assignments. Channel resource assignments made by the assignor are provided to the data scheduler 56. The data scheduler operates to schedule data communications in conformity with the assignments made by the assignor. Appropriate control signals are provided to the RF transceiver front ends 30 and to the baseband element to control their respective operation to provide for the communication of the data scheduled by the data scheduler. Data scheduling information is here also provided to the data scheduler by the radio protocol stack 18. The message generator 62 is also provided with indications of the communication resource assignments and data schedule made by the data scheduler. The message generator operates to generate a message for communication to the mobile station to alert the mobile station of the resource assignments and schedule made by the data scheduler. The message is here provided by way of the line 43 to the radio protocol stack, subsequently to be operated upon by the baseband element and caused to be communicated by one or more of the transceiver front ends 30.

The receive chain portion of the mobile station 14 is illustrated in the figure. The mobile station includes antenna transducers 64, an RF element 66 formed of RF transceiver front ends 67, a baseband element 68, and a radio protocol stack 74.

The mobile station includes a multi-carrier radio resource control logic element 78, also of an embodiment of the present invention. The element 78 includes a detector 82 and a controller 84. The radio resource control logic element is coupled, at least functionally, to the radio protocol stack, here indicated by way of the lines 86 and 88, to the baseband element by way of the line 92, and to the RF transceiver front ends of the RF element by way of the lines 94.

The detector 82 operates to detect a message generated by the message generator 62 of the network station and communicated to the mobile station. And, the detector operates to extract values contained in the message or otherwise operates to identify the channel assignments or data schedule contained in the communicated message. Detections made by the detector are provided to the controller 84. The controller operates to control operation of the mobile station responsive to the values detected in the message. For downlink communications, the controller causes operation of the mobile station in a manner best to receive the subsequently communicated EDGE data. And, for uplink communications, the controller causes operation of the mobile station to communicate best uplink data that is subsequently communicated by the mobile station.

Figure 2:
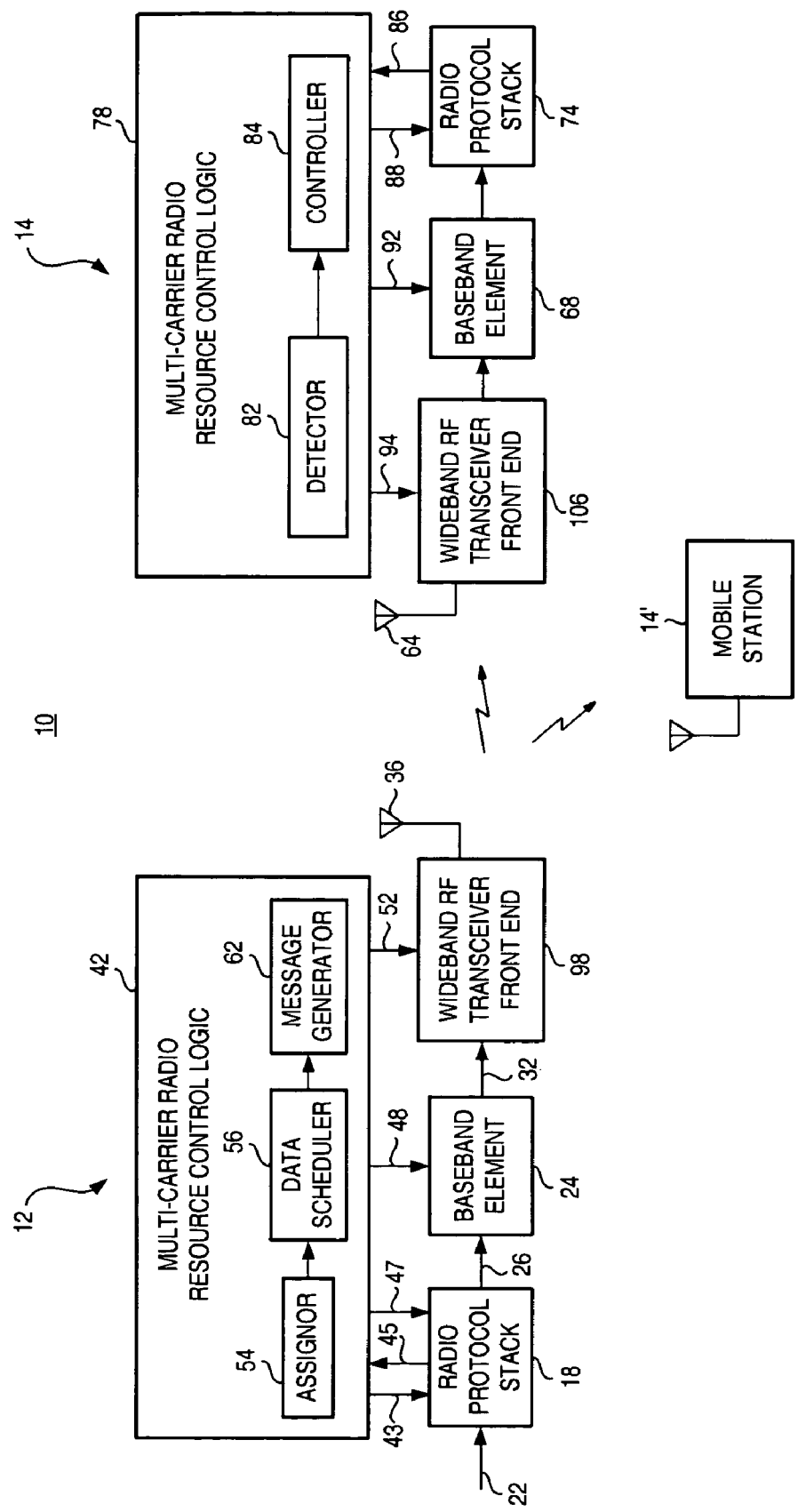
FIG. 2 illustrates a functional block diagram, similar to that shown in FIG. 1, but of another exemplary communication system that also includes an embodiment of the present invention as a portion thereof.

FIG. 2 illustrates a communication system, similar to that shown in FIG. 1, also formed of a set of communication stations 12 and 14. Elements of the communication system 10 shown in FIG. 2 that correspond to those forming the communication system shown in FIG. 1 are commonly-referenced. The function, operation, and connection of such commonly-referenced elements correspond with their counterparts shown in FIG. 1. Reference to the description of FIG. 1 provides the details of their function, operation, and connection.

Here, in contrast to the communication stations 12 and 14 shown in FIG. 1, the communication stations include wideband RF transceiver front ends 98 and 106. That is to say, the network station includes a single radio frequency transmitter 98 that transmits multiple, contiguous radio frequency channels converted from a single baseband signal. And, the mobile station 14 includes a single radio frequency receiver 106 having a radio frequency and baseband bandwidth sufficiently wide to receive more than one contiguous radio frequency channel and associated baseband information.

During operation of the multi-carrier radio resource control logic element 42, communication resource allocations are made to minimize the number of burst periods assigned over all radio frequency carriers to both downlink and uplink time slots, as appropriate, subject to various constraints. First, the time slots must be allocable; that is, the time slots are not used for other traffic communications by other sets of communication stations pursuant to other communication sessions.

Second, the time slots that are allocated are allocated over the sum of all allocable burst periods and the sum of all available mobile-station, radio frequency receiver elements is greater than or equal to the number of burst data that are required for the transmission of one radio block.

Third, the time slots are allocated over the sum of all allocable burst periods and the sum of all available mobile station radio frequency receivers MOD the number of burst data that are required for transmission of one radio block is equal to zero. That is to say, only full blocks are allocated, not partial radio blocks.

Fourth, assignments are further dependent upon the minimum latency required to tune the RF stage, either the plurality of transceiver front end elements or the wideband transceivers and become ready either to receive on another carrier frequency or transmit is observed.

Fifth, the resource assignations and data schedule is further dependent upon the minimum latency period required to tune the RF stage, howsoever implemented, and become ready to receive on a measurement frequency. And, sixth, a final constraint is that a measurement frequency is not equal to a transmit frequency.

The above decisions and constraints are represented mathematically by:

$$\text{MIN: } \sum_{b=1}^{Nb} B_b u_b; u \in \{0, 1\}$$

$$ST: u = \begin{cases} a = 1 \wedge \left[ \left( \sum_{b=1}^{Nb} \sum_{R=1}^{N_R} T_{bR} \geq d \right) \wedge \left( \sum_{b=1}^{Nb} \sum_{R=1}^{N_R} T_{bR} \text{ MOD} d = 0 \right) \wedge L_T \geq B \wedge L_M \geq B \wedge f_m \neq f_t \right] : 1 \\ \text{Else: } 0 \end{cases}$$

Where:
b=burst period
R=RF deck number (both transmit and receive)
Nb=Maximum burst periods possible in allocation
Nr=Maximum number of RF decks available for simultaneous reception in mobile terminal
$B_b$=Burst period (for GSM/EDGE=577 μs) at timeslot number "b"
$T_{bR}$=Radio resource of timeslot at timeslot number "b" on RF deck "R" for mobile receiver
$u_b$=Utilization of timeslot "b" according to constraints (Boolean)
a=Timeslot availability for allocation to mobile downlink (Boolean)
d=Number of data bursts required per radio block (for GSM/EDGE=4)
$L_T$=Minimum latency required to switch between last allocated receive slot and either i) another allocated receive slot on another RF carrier or ii) the allocated transmit slot (for GSM/EDGE=1 burst period=577 μs)
$L_M$=Minimum latency required to switch between last allocated transmit slot and measurement slot (for GSM/EDGE=1 burst period=577 μs)

Figure 3:
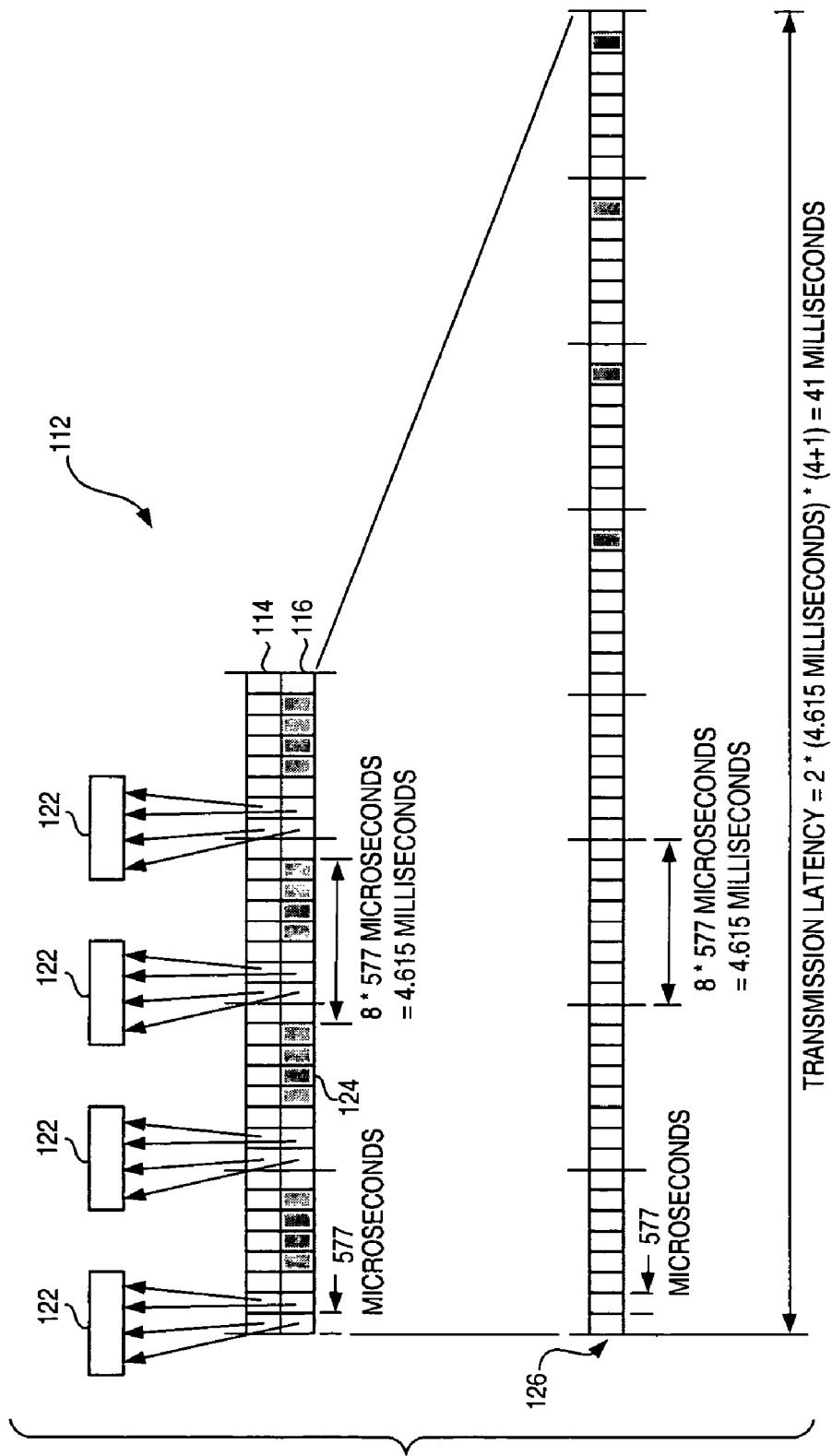
FIG. 3 illustrates a graphical representation of utilization of the slotted radio air interface of the communication systems shown in FIGS. 1 and 2 pursuant to exemplary operation of an embodiment of the present invention together with a comparison with a corresponding communication allocation provided in a conventional communication scheme.

FIG. 3 illustrates a representation, shown generally at 112, of exemplary resource allocations made pursuant to operation of an embodiment of the present invention. Here, resources are allocated upon two radio carriers 114 and 116. Four time frames, each formed of eight time slots on each of the two radio carriers is shown in the figure. Time slot assignments are made on the first and second time slots of both of the radio carriers 114 and 116. That is to say, during the time period corresponding to a single time frame, four time slots are allocated for communication of data. The four time slots provide for the communication of data of an amount corresponding to the data that is conventionally communicated over a radio block defined over four time frames. The blocks 122 are representative of the downlink data block corresponding to the time slots allocated on the separate carriers 114 and 116.

In the exemplary representation, acknowledgments are further returned acknowledging receipt of the data communicated upon the allocated time slots. The time slots 124, within a single time frame, represent time slots within which the exemplary uplink acknowledgments are returned to the network station.

Thereby, within the time period corresponding to a single time frame, data constituting the data of an entire radio block is communicated to the mobile station, and the mobile station acknowledges receipt of the data. The coding of an entire block in an acknowledgment of its reception and decoding, within a single TDMA frame period, is thereby provided.

Further represented in the figure is an exemplary resource allocation of a radio block in conventional practice, indicated at 126. In conventional operation, a single time slot is allocated within a single time frame, and time slots over four time frames are allocated upon a single radio carrier. And, when acknowledgments are provided, the acknowledgments are provided in subsequent time frames. Comparison of the allocations indicates the reduced latency provided through operation of an embodiment of the present invention.

Figure 4:
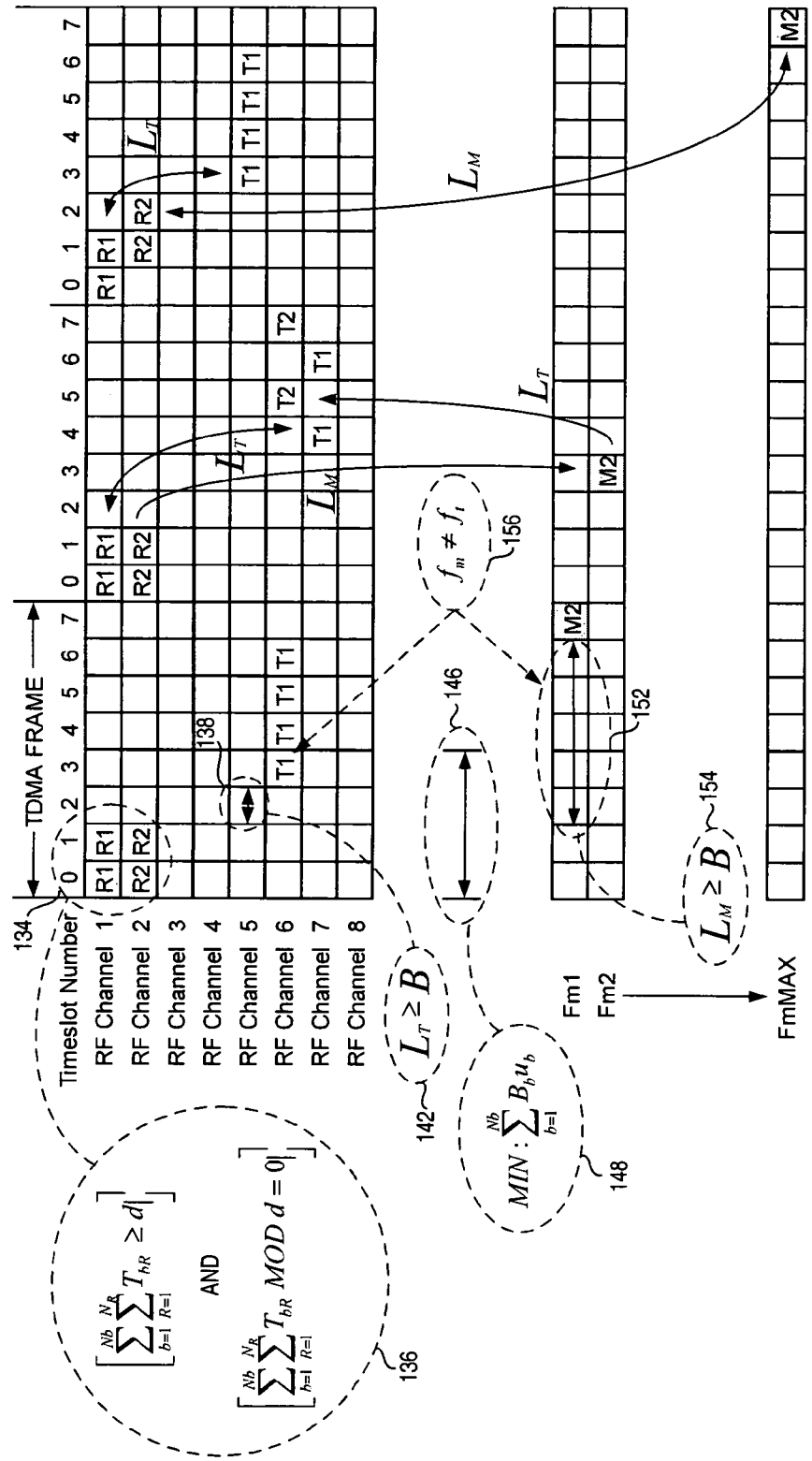
FIG. 4 illustrates another representation of exemplary communication resource allocation pursuant to operation of an embodiment of the present invention.

FIG. 4 illustrates another representation, shown generally at 132, here of a two-receiver mobile station and resource allocations over three time frame periods, each time frame period formed of eight time slots, numbered 0-7 in FIG. 4. As indicated by the circles 134 and 136, the resources allocated during the first two time slots of the RF channel carriers 1 and 2 satisfy the constraint indicated mathematically in the circle 136. Subsequent transmit allocations in time slots identified as time slots 3, 4, 5, and 6 are allocated with the latency constraint indicated by the circles 138 and 142. The additional constraints are indicated by the circles 146 and 148, 152 and 154, and 156.

Again, analysis of the resource allocations indicate that the data corresponding to an entire radio block is communicated, and acknowledged, within a single time frame. Additional exemplary allocations are indicated in the second and third time frames of the illustration of FIG. 4.

Figure 5:
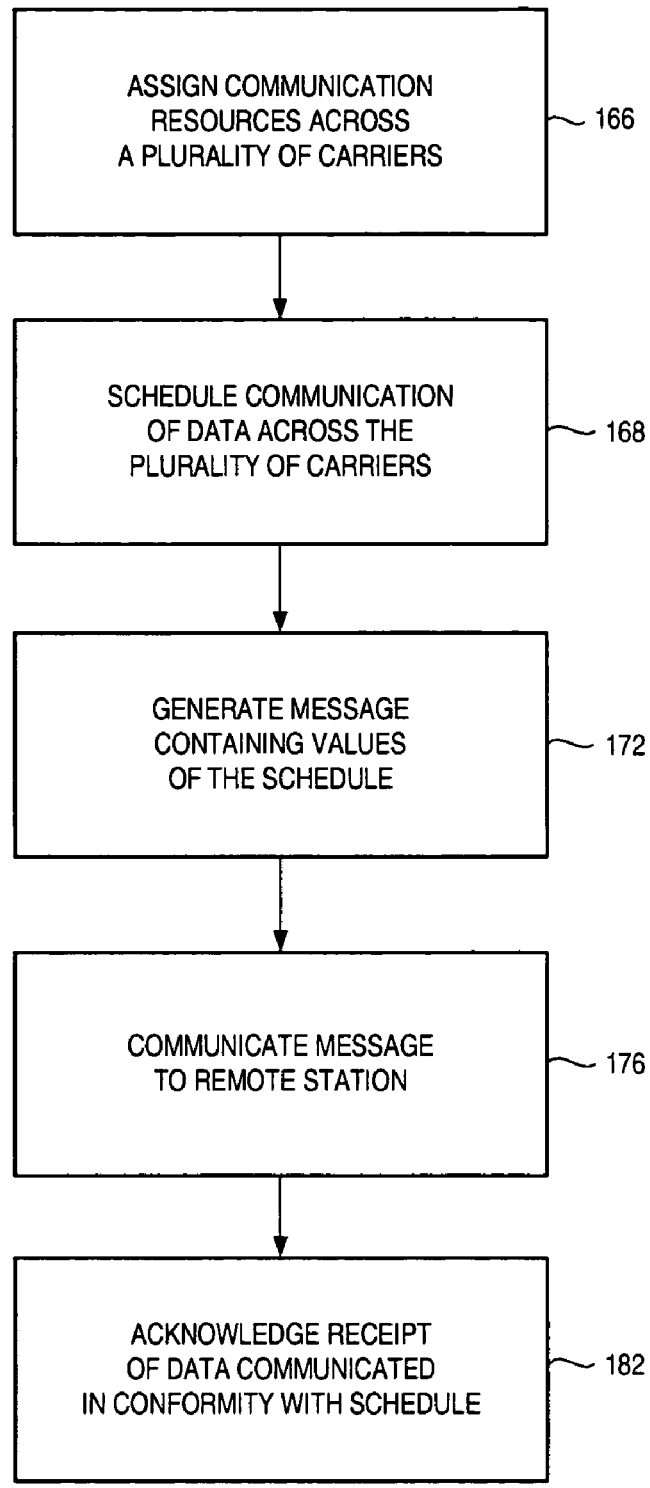
FIG. 5 illustrates a method flow diagram representative of the method of operation of an embodiment of the present invention.

FIG. 5 illustrates a method flow diagram, shown generally at 162, representative of the method of operation of an embodiment of the present invention. The method facilitates communication of data by a first communication station pursuant to a communication scheme that provides for mobile allocation index offset. The data is of an amount corresponding to the data communicable during a selected number of time slots of a radio block formed across a plurality of time frames.

First, and as indicated by the block 166, communication resources are assigned. The communication resources that are assigned are assigned across a plurality of radio carriers.

Then, and as indicated by the block 168, communication of the data is scheduled in conformity with the assignations made during the operation of assignment. The schedule of the communication of the data provides for completion of the communication of the data within a single time frame of the plurality of time frames. Subsequently, and as indicated by the block 172, a message is generated. The message includes values representative of the schedule. The message, when communicated, identifies the schedule to a remote station. And, as indicated by the block 176, the message is communicated to the remote station. And, as indicated by the block 182, an acknowledgment is returned by the remote station to acknowledge receipt of data subsequently communicated in conformity with the schedule.

As the resources are assigned, the data is scheduled for communication, and is communicated, with lessened levels of latency, improved communication performance is provided.

The previous descriptions are of preferred examples for implementing the invention, and the scope of the invention should not necessarily be limited by this description. The scope of the present invention is defined by the following claims.

What is claimed is:

1. Apparatus for facilitating communication of a data block by a first communication station, said apparatus comprising:
processing circuitry configured to:
receive an indication of an amount of data to be communicated by the first communication station, and assign communication resources to convey all of said indicated data amount, said assigned communication resources comprising a plurality of time slots from a single time frame and at least two radio carriers; and
receive an indication of assigned communication resources, and to schedule communication of the data block in conformity with the assigned communication resources and in response to a communication station minimum tuning latency period, wherein the schedule of the communication of the data block provides for completion of the communication of the data block and acknowledgement of successful delivery of the data block within the single time frame.

2. The apparatus of claim 1 wherein said processing circuitry configured to receive an indication of which radio carriers are available upon which to communicate the data block, and wherein assignment of the communication resources assigned is further responsive to the indication of which radio carriers are available.

3. The apparatus of claim 1 wherein said processing circuitry is configured to receive an indication of communication resource availability and wherein the schedule of the communication is further responsive to the communication resource availability.

4. The apparatus of claim 1 wherein the radio block is formed across a number of time frames and wherein the number of time slots comprises the number of frames required to communicate one radio block, the schedule of the communication comprises schedule of an exact number of time slots within the single time frame for communication of one radio block.

5. The apparatus of claim 1 wherein plurality of time slots comprise a number at least equal to the number of time slots.

6. The apparatus of claim 1 wherein said processing circuitry further configured to receive indications of the schedule and to generate a message including values representative of the schedule, when communicated.

7. The apparatus of claim 1, wherein the scheduling communication of the data block is further in response to at least one of a minimum latency period required to change between mobile allocation index offsets, a minimum latency period required to change between transmit and receive modes of operation, and a minimum latency period required to change between a communication mode and a measurement mode.

8. The apparatus of claim 1 wherein said processing circuitry is further configured to receive an indication of the communication capability of a second communication station and to schedule communication of the data block in further conformity with the received indication of the communication capability of said second communication station.

9. A method for facilitating communication of a data block by a first communication station, said method comprising the operations of:

receiving an indication of an amount of data to be communicated by the first communication station;

assigning communication resources to convey all of said indicated data amount, said assigned communication resources comprising a plurality of time slots from a single time frame and at least two radio carriers; and scheduling communication of the data block in conformity with assignments made during said operation of assigning and responsive to a communication station minimum tuning latency period, wherein the schedule of the communication of the data block provides for completion of the communication of the data block and acknowledgement of successful delivery of the data block within the single time frame.

10. The method of claim 9 further comprising the operation, prior to said operation of assigning, of detecting an indication of which radio carriers are available upon which to communicate the data block, and wherein the communication resources assigned during said operation of assigning are further responsive to the indication of which radio carriers are available.

11. The method of claim 9 further comprising the operation of detecting an indication of communication resource availability and wherein the schedule of the communication made during said operation of scheduling is responsive, in part, to the communication resource availability.

12. The method of claim 9 wherein the radio block is formed across a number of time frames and wherein the number of time slots comprises the number of frames required to communicate one radio block, the schedule of the communication scheduled during said operation of scheduling comprising an exact number of time slots within the single time frame for communication of one radio block.

13. The method of claim 9 comprising the further operation of generating a message including values representative of the schedule, the message, when communicated, identifying the schedule to a remote station.

14. The method of claim 9 comprising the further operation, at a remote station, of acknowledging receipt of the data, once communicated thereto, acknowledgments returned to the first communication station within the single time frame.

15. The method of claim 9, wherein said scheduling communication of the data block is further responsive to at least one of a minimum latency period required to change between mobile allocation index offsets, a minimum latency period required to change between transmit and receive modes of operation, and a minimum latency period required to change between a communication mode and a measurement mode.

16. The method of claim 9 further comprising receiving an indication of the communication capability of a second communication station and scheduling communication of the data block in further conformity with the received indication of the communication capability of said second communication station.

* * * * *